(12) United States Patent
Laramee et al.

(10) Patent No.: US 6,823,819 B2
(45) Date of Patent: Nov. 30, 2004

(54) APPARATUS FOR RAISING A SOW IN A FARROWING CRATE

(75) Inventors: Gerald E. J. Laramee, Labroquerle (CA); Jonathan Kleinsasser, Ste. Agathe (CA)

(73) Assignee: Cryatal Spring Hog Equipment Ltd., Agathe (CA)

( * ) Notice: Subject to any disclaimer, the term of this patent is extended or adjusted under 35 U.S.C. 154(b) by 0 days.

(21) Appl. No.: 10/453,926

(22) Filed: Jun. 4, 2003

(65) Prior Publication Data
US 2004/0149237 A1 Aug. 5, 2004

(30) Foreign Application Priority Data
Feb. 5, 2003 (CA) .............................................. 2418518

(51) Int. Cl.[7] .................................................. A01K 1/02
(52) U.S. Cl. ...................................... 119/505; 119/445
(58) Field of Search ................................ 119/503, 504, 119/505, 509, 445

(56) References Cited

U.S. PATENT DOCUMENTS

| | | | |
|---|---|---|---|
| 1,361,660 A | | 12/1920 | Adix et al. |
| 3,827,402 A | * | 8/1974 | Laurenz ...................... 119/445 |
| 4,135,339 A | * | 1/1979 | Pawlitschek ................. 52/660 |
| 4,145,993 A | | 3/1979 | Notarianni et al. |
| 4,294,195 A | * | 10/1981 | Rodenberg et al. ......... 119/509 |
| 4,323,033 A | * | 4/1982 | Vosyka et al. ........... 119/14.04 |
| 4,793,287 A | | 12/1988 | Hofmann |
| 5,372,091 A | * | 12/1994 | Rhodes ........................ 119/505 |
| 5,622,138 A | * | 4/1997 | Underhill .................... 119/51.5 |
| 5,921,205 A | | 7/1999 | Nooyen et al. |
| 6,382,135 B1 | * | 5/2002 | Van Grootheest et al. .. 119/446 |
| 6,571,741 B1 | * | 6/2003 | Kongsgaard ................ 119/503 |

FOREIGN PATENT DOCUMENTS

| | | | | |
|---|---|---|---|---|
| GB | 932189 | | 7/1963 | |
| GB | 0573934 A1 | * | 6/1992 | .......... A01K/15/02 |

* cited by examiner

Primary Examiner—Peter M. Poon
Assistant Examiner—Bethany L. Griles
(74) Attorney, Agent, or Firm—Adrian D. Battison; Michael R. Williams; Ryan W. Dupuis (57) ABSTRACT

In a farrowing pen which includes a pit and over the pit a first floor section on which the sow can stand and lie and two further floor sections on each side of the first floor section for receiving piglets of the sow and confining walls for locating the sow on the first floor section there is provided an apparatus for lifting the sow away from the piglets to prevent crushing. The apparatus includes a base carries above the pit either on legs or on a cradle and a gas bag lift mechanism carried on the base above the manure and arranged to raise a plate carrying two parallel rails with the first floor section thereon. An air valve extends through the flooring and is operated by pressure from contact with the sow for actuating the controlling the flow of the air. The rate of lifting is faster than the rate of lowering. Extendible legs around the base support and guide the floor on the bag.

25 Claims, 9 Drawing Sheets

APPARATUS FOR RAISING A SOW IN A FARROWING CRATE

This invention relates to an apparatus for raising a sow in a farrowing crate relative to a floor for the piglets for reducing piglet mortality by crushing as the sow lies or treads during movement to access feed and water.

BACKGROUND OF THE INVENTION

In British patent 932189 (Hodgkinson) issued in 1963 is shown a farrowing crate or pen for sows where the level of the outer floor section which carries the piglets can be raised and lowered in order to move the piglets away from danger from the sow when the sow is standing. Thus when the sow lies down, the piglets are kept away from the height of the floor level on which the sow lies to reduce the possibility of crushing.

This arrangement uses a light beam and electric switches to detect the movement of the sow and uses a complex lifting arrangement. The device is currently not available on the market.

U.S. Pat. No. 4,793,287 of Hoffmann issued in 1988 discloses a modified arrangement in which lifting and lowering of the piglet floor section is actuated by an alternative arrangement. However again this construction is disadvantageous and is not available in the market place.

SUMMARY OF THE INVENTION

It is one object of the present invention, therefore, to provide an improved apparatus for raising and lowering a sow in a farrowing pen.

According to one aspect of the invention there is provided a farrowing pen or crate for sows comprising:

a floor assembly for receiving the sow and piglets which includes a first floor section on which the sow can stand and lie and two second floor sections each on a respective side of the first floor section for receiving piglets of the sow;

the floor assembly including a support structure for supporting the floor sections;

confining walls for locating the sow on the first floor section;

the support structure including a separate support element for carrying the first floor section;

a base member under the floor assembly on which the support element is mounted;

a lift mechanism, operated by a power source, carried on the base member and arranged to raise and lower the support element with the first floor section thereon relative to the second floor sections between a lowered position in which the first floor section is level with the second floor sections and a raised position in which the first floor section is raised to a height which prevents the sow when lying crushing the piglets on the second floor sections;

and a sensor responsive to movement of the sow tending to stand to actuate the lift mechanism to raise the first floor section and responsive to movement of the sow to a lying position to actuate the lift mechanism to lower the first floor section.

Preferably the sensor comprises a switch which is arranged at the floor for pressure on the switch when the sow is lying.

Preferably the switch includes an actuator which is covered by a cover plate on to which the sow can lie.

Preferably the cover plate is a channel resting along floor bars of the first floor section.

Preferably the lift mechanism includes an air bag and the power source comprises a supply of compressed air and wherein the sensor is arranged for actuating an air supply valve. However other lift mechanisms can be used including a hydraulically actuated cylinder which drives the lifting action through a suitable linkage such as a scissors type linkage, and including an electric screw type system, depending upon the power source available and selected for use. However the air actuated system using an air bag is preferred in that it is resistant to corrosion and uses readily available air from a compressor.

Preferably the lift mechanism includes a guide structure for guiding movement of the first floor section in a vertical direction while maintaining the first floor section horizontal. This can be a set extendible vertical guide legs at horizontally spaced positions relative to the first floor section or other guide arrangements can be used which provide a lower profile such as parallel links connected by a rod.

In most cases, the floor sections are arranged above a manure pit having a bottom wall for receiving manure falling through the floor and the base member is carried at a position above the bottom wall of the pit as to support the lift mechanism above the manure.

The base member is preferably carried on a support mounted above the bottom of the pit to support the lift mechanism above the manure and to keep it raised above the pit floor to allow the use of conventional scrapers along the pit floor. In this arrangement, preferably the base member is carried on a cradle supported from the top of the pit to support the lift mechanism above the manure.

Preferably the lift mechanism is arranged such that the time for lowering of the first floor section from the raised position to the lowered position is longer than the time for raising.

Preferably there is provided a manually operable switch for controlling the lift mechanism by which the first floor section can be lowered for release of the sow and by which the first floor section can be raised to maintain the piglets in the second floor section for catching.

According to a second aspect of the invention there is provided a farrowing pen for sows comprising:

a floor assembly for receiving the sow and piglets which includes a first floor section on which the sow can stand and lie and two second floor sections each on a respective side of the first floor section for receiving piglets of the sow;

the floor assembly including a support structure for supporting the floor sections;

confining walls for locating the sow on the first floor section;

the support structure including separate support elements for carrying the first and second floor sections;

a base member under the floor assembly on which the support element is mounted;

a lift mechanism, operated by a power source, carried on the base member and arranged to raise and lower one of the support elements relative to the other between a position in which the first floor section is level with the second floor sections and a position in which the first floor section is at a height above the second floor section which prevents the sow when lying crushing the piglets on the second floor sections;

and a sensor responsive to movement of the sow tending to stand to actuate the lift mechanism to operate the lift mechanism;

wherein the floor sections are arranged above a manure pit having a bottom wall for receiving manure falling through the floor and wherein the base member is carried at a position above the bottom wall of the pit as to support the lift mechanism above the manure;

and wherein the base member is carried on a support mounted above the bottom of the pit to support the lift mechanism above the manure.

According to a third aspect of the invention there is provided a farrowing pen for sows comprising:

a floor assembly for receiving the sow and piglets which includes a first floor section on which the sow can stand and lie and two second floor sections each on a respective side of the first floor section for receiving piglets of the sow;

the floor assembly including a support structure for supporting the floor sections;

confining walls for locating the sow on the first floor section;

the support structure including separate support elements for carrying the first and second floor sections;

a base member under the floor assembly on which the support element is mounted;

a lift mechanism, operated by a power source, carried on the base member and arranged to raise and lower one of the support elements relative to the other between a position in which the first floor section is level with the second floor sections and a position in which the first floor section is at a height above the second floor section which prevents the sow when lying crushing the piglets on the second floor sections;

and a sensor responsive to movement of the sow tending to stand to actuate the lift mechanism to operate the lift mechanism;

wherein the sensor comprises a switch which is arranged at the floor for pressure on the switch when the sow is lying.

According to a fourth aspect of the invention there is provided a farrowing pen for sows comprising:

a floor assembly for receiving the sow and piglets which includes a first floor section on which the sow can stand and lie and two second floor sections each on a respective side of the first floor section for receiving piglets of the sow;

the floor assembly including a support structure for supporting the floor sections;

confining walls for locating the sow on the first floor section;

the support structure including separate support elements for carrying the first and second floor sections;

a base member under the floor assembly on which the support element is mounted;

a lift mechanism, operated by a power source, carried on the base member and arranged to raise and lower one of the support elements relative to the other between a position in which the first floor section is level with the second floor sections and a position in which the first floor section is at a height above the second floor section which prevents the sow when lying crushing the piglets on the second floor sections;

and a sensor responsive to movement of the sow tending to stand to actuate the lift mechanism to operate the lift mechanism;

wherein the lift mechanism includes an air bag and the power source comprises a supply of compressed air and wherein the sensor is arranged for actuating an air supply valve.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
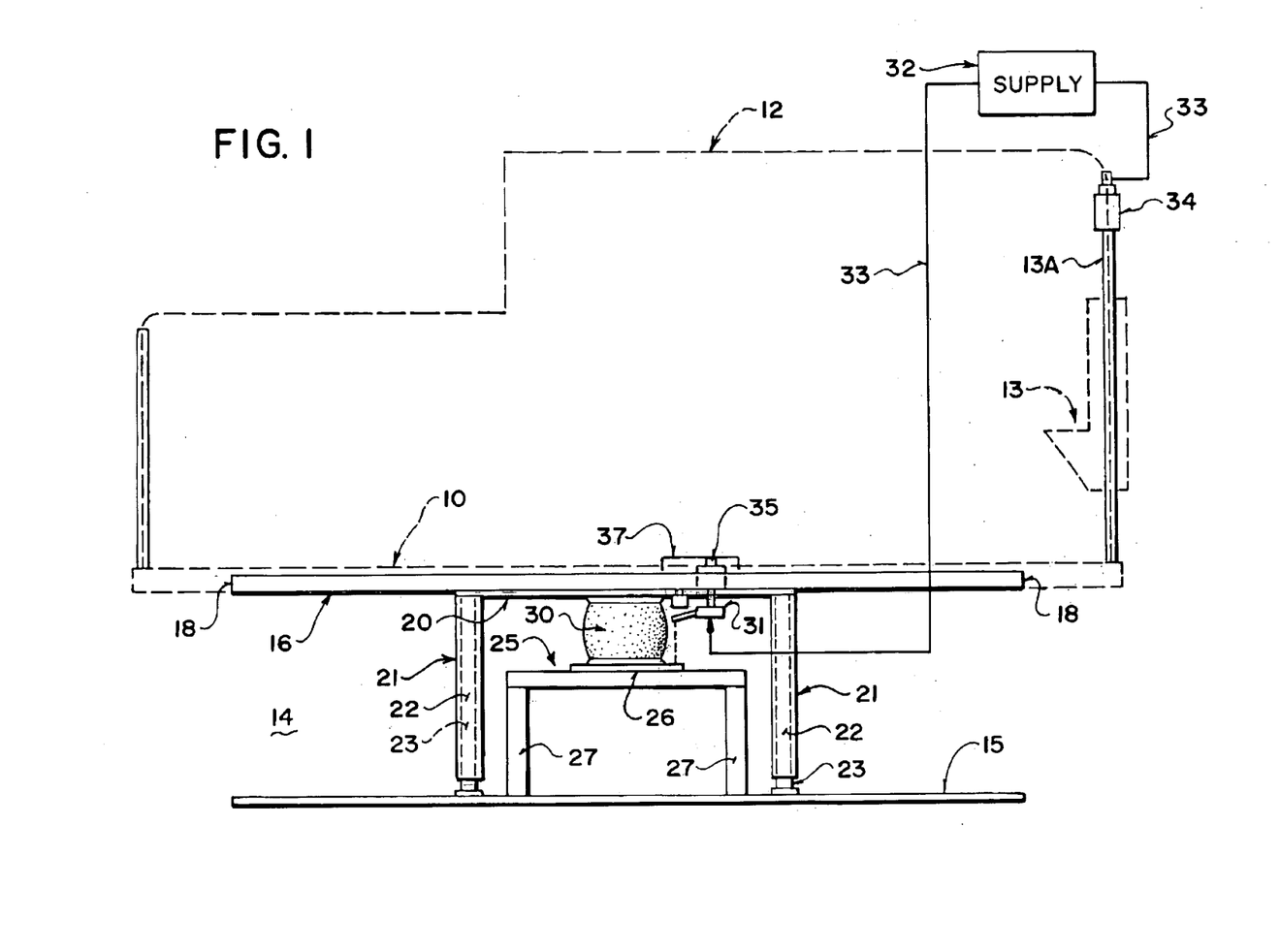
FIG. 1 is a side elevational view through a farrowing pen showing the lifting apparatus according to the present invention.
Figure 2:
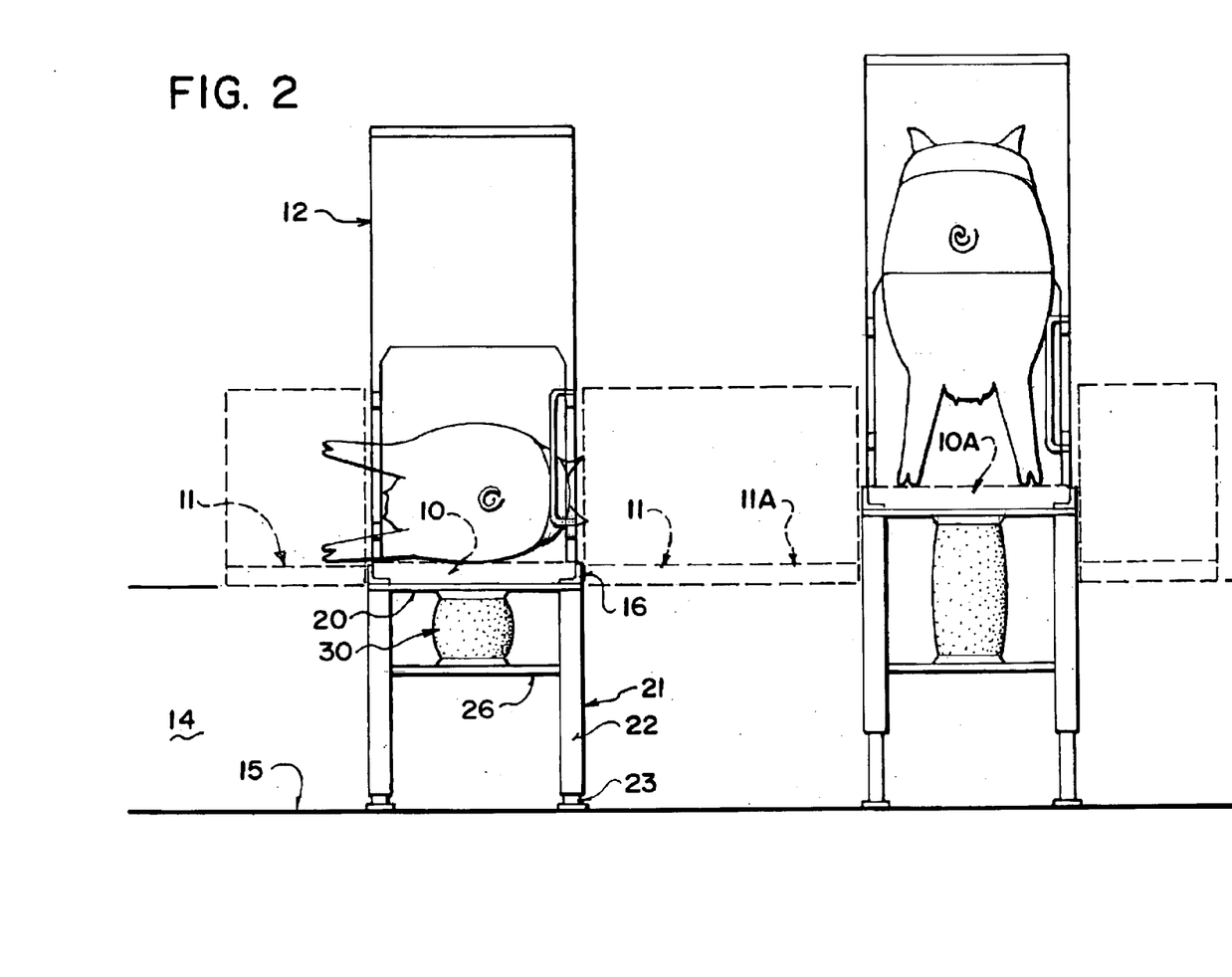
FIG. 2 is a rear elevational view of the farrowing pen of FIG. 1.

In FIGS. 1 and 2 is shown the construction of the present invention somewhat schematically showing the operation of the device and the basic construction of the device.

A farrowing crate thus comprises a first floor section 10 for receiving the sow. The floor section 10 can be formed from many different types of flooring all of which are presently commercially available including plastics flooring, cast iron flooring and flooring of plastics coated metal. The floor section has a width and length sufficient to receive the sow and is in some cases formed from panels which are arranged end to end to form the complete floor section. On each side of the first floor section is provided to second floor sections 11 which are arranged for receiving the piglets. The characteristics of the floor therefore are significantly different and they include heating pads and the like to properly provide the required situation for the piglets including the required ambient temperature.

The second floor sections 11 are arranged so that a next adjacent farrowing pen provides an adjacent floor section 11A with a further floor section 10A for the next adjacent sow.

Each first floor section 10 includes a crate 12 providing confining walls which locate the sow front and back and side to side so that the sow is maintained in the area on top of the floor and is prevented from moving to the sides into the area of the floor section 11 or out of the pen in front to rear direction. The walls are shown only schematically since these are well known to one skilled in the art and the construction can vary depending upon the particular manufacture of the farrowing crate. A feeder 13 is provided on a front wall 13A for providing feed and water to the sow when required. In order to take the feed and water, the sow stands on the floor section 10 to feed voluntarily and then to lie down when feeding is complete.

The floor sections 10 and 11 are arranged over a pit 14 having a pit floor 15 onto which manure collects from the pens by passing through the flooring which is suitably perforated. The depth of the pit is generally of the order of 18 to 24 inches which allows manure to collect in the bottom of the pit up to a depth of no more than 9 to 15 inches for collection through a collection system.

The floor section 10 is carried on a pair of side rails 16 each forming an angle iron with a horizontal base flange and upstanding vertical flange at the outside edge of the rail. Thus the angle irons provide a top face 17 onto which the flooring rests so that it spans across the parallel rails 16 and extends along the length of the rails and outwardly beyond ends 18 of the rails to the front and rear of the pen. Different types of flooring rest upon the angle irons 16 in a different manner as required by the construction of the flooring and some includes lips which engage over the edges 17 and others sit within the edges 17 on the horizontal portion of the angle irons.

The angle irons are carried on a plate 20 which spans across the width of the floor section 10 and extends along a part of the length of the angle iron 16. The angle irons are bolted to the plate or may be welded to the plate along the side edges of the plate with the plate having sufficient length to provide support for the angle irons to prevent bending, twisting or tilting.

The plate 20 is thus generally square and has at its four corners each of four legs 21 which extend from the plate downwardly to the bottom surface 15 of the pit. The legs 21 include an outer tube 22 and an inner tube 23 allowing the legs to be extendable as guides by the sliding movement of the tubes. Thus the inner tube 23 sits on the bottom of the pit and the outer tube 22 is welded to the bottom of the plate. The legs thus act as guides and also act as a bottom stop providing a minimum height of the floor section 10 when it is lowered toward the pit. At that minimum height the floor section 10 is at the same height as the floor section 11 as shown at the left in FIG. 2.

Inside the legs 21 is provided a base member 25 including a top plate 26 and four supporting legs 27. Thus the legs 21 are arranged around the outside of the base 25 at spaced positions.

Between the top plate 26 of the base and the plate 20 is provided an inflatable gas bag 30. Such gas bags are commercially available and are conventionally used in truck suspension systems but many different types of such bags having different inflation and expansion parameters are available from commercial suppliers.

A commercially available valve 31 is provided which can be operated to control air from an air supply 32 to a regulator valve 34 through a line 33 and from the valve 31 into the gas bag 30. The valve is normally maintained closed so that the bag is uninflated. The valve 31 includes an actuator which projects upwardly as a stud or button 35 extending through the slot between two of the rails 10B of the floor section 10. In some cases it is necessary to cut out a part or one of the rails or one of the parts of the flooring so as to allow the actuator pin to project through the floor into a position above the height of the flooring.

Figure 4:
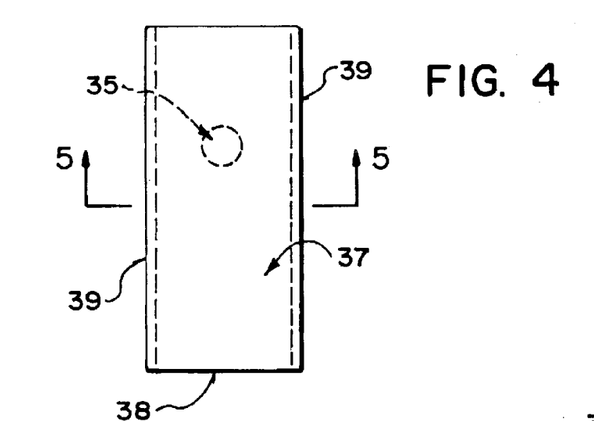
FIG. 4 is a top plan view of a portion only of the farrowing pen of FIG. 1.
Figure 5:
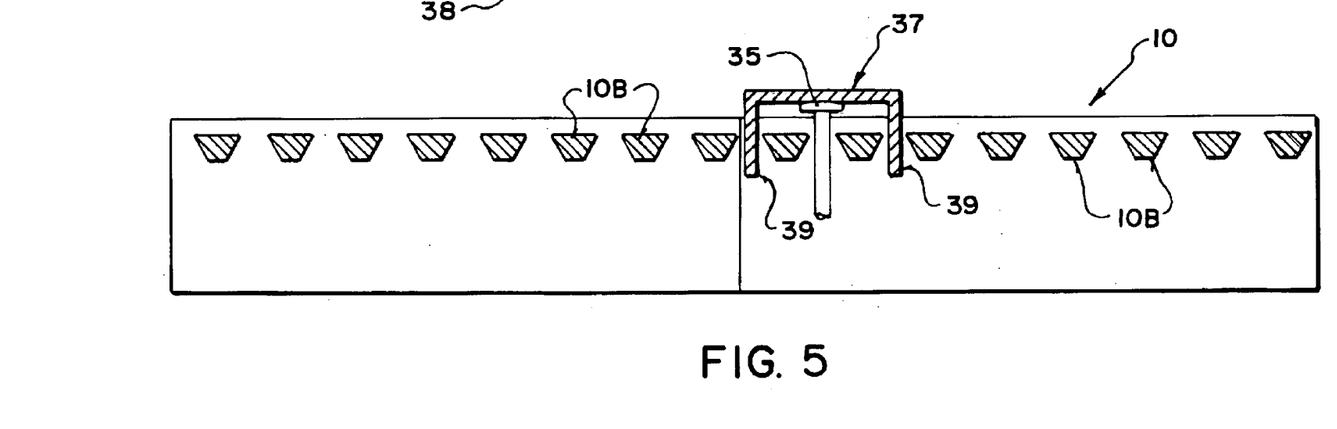
FIG. 5 is a cross sectional view along the lines 5—5 of FIG. 4.

The pin is covered by a channel member which sits on top of the pin and thus provides an elongate plate 37 sitting on top of the floor section 10 slightly raised from the floor. The plate has one end 38 resting on the floor and the pin holds the other end upwardly from the floor so that the plate can be pushed down toward the floor by pressure from the sow. Thus the valve actuator pin 35 is directly actuated by pressure from the sow and the channel provides an increased area over which the pressure from the sow can be applied causing the actuation of the valve. The channel 37 has depending side walls 39 which project between the rails 10B of the flooring to hold the plate in place. The plate may be attached to the top of the pin so that it cannot slide forwards and rearwards under forces from the sow.

The positioning of the plate is such that it is under the chest area of the sow so as to provide effective contact when the sow lies down.

The valve 31 thus can be operated by release of pressure caused by the animal tending to stand to allow the supply of air from the supply 32 into the gas bag 30 expanding the gas bag and causing the support for the floor to move upwardly to the maximum height. This movement is effected relatively quickly so that the sow is lifted away from the flooring 11 to the raised height while deterring any piglets from entering onto the flooring 10 to be raised therewith.

Figure 3:
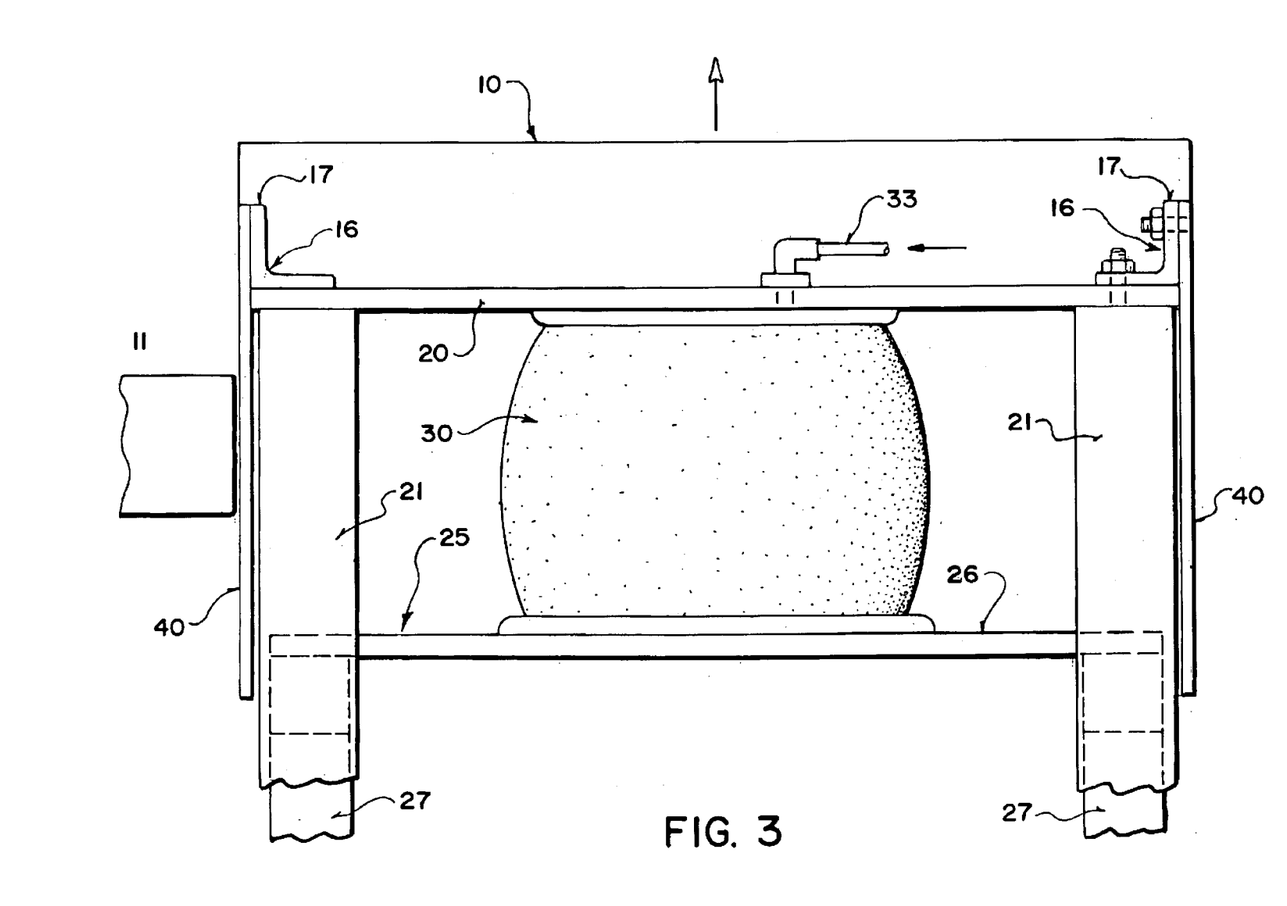
FIG. 3 is a rear elevational view similar to that of FIG. 2 on an enlarged scale.

As shown in FIG. 3, on each side is provided a panel 40 alongside the legs 21 so as to close off the area on either side of the floor to prevent the piglets from entering into the area underneath the floor 10.

When the sow lies down, this applies pressure onto the plate 37 actuating the valve so as to close off supply of air from a supply 32 and acting to release the air from the gas bag through a discharge orifice. The discharge is arranged so that the floor 10 moves relatively slowly in the downward direction so that the sow is given time to lie down before the floor reaches the lowered position at the height of the floor 11.

The device is thus arranged to save piglets from the first second of birth to the day they get weaned. This unit works on air only. The unit is arranged to be installed beneath the sow's floor only, in existing barns in new barn construction. Every farrowing barn operation will benefit from this invention.

Even if the sow only sits up, the actuator valve on this unit will be activated and it only takes approximately nine seconds for the sows to raise up to twelve inches. This does not give the piglets enough time to get beneath the sow if she decides to lay down again. Once the sow is standing the unit is fully raised, her piglets are now confined only on the second floor sections so she can eat and drink the sufficient amount she needs to conserve her body fat. If the sows eat well this means they will also milk well and that is what is required to wean big, nice healthy pigs. The time it takes for this unit to retract after the sow lays down again is approximately twenty seconds. This is sufficient time for most sows to have laid on their side again and by not having any piglets in her way the amount of laid-on and stepped-on pigs will be reduced tremendously.

This unit will also give that extra time for the low viability piglets to gain strength which normally they fall over beneath the sow while she is standing and get crushed by her because they are not strong enough to get out of her way. This unit is a low cost and low maintenance device for what it is capable of saving. Pre-weaning mortality will decrease and pigs weaned per mated female per year will increase. At weaning time the advantage of this unit is having a shut off valve in your farrowing room which means the sows will get out of the crates as normal. When comes time to pick up the weanlings, one valve that supplies the air in that room can be operated and this means all your weanlings in each of these pens are confined to their storage space, this way it becomes one third of the area to catch them. This unit is efficient by itself and also efficient for the work load for hog producers.

A second embodiment is shown in FIGS. 6 through 9 which comprises a similar farrowing crate to that previously described having a central floor section for the sow and two side sections for the piglets. The farrowing crate is mounted over a pit and provides a lifting system for the sow floor including the confining walls for the sow relative to the floor sections for the piglets. The system utilizes an air bag for the lifting mechanism substantially as previously described. The system uses the same pressure switch arrangement as previously described which causes the sow to lie upon a switch mechanism actuating a valve for controlling the supply of air to the gas bag propulsion system.

In the embodiment of FIGS. 6 through 9, the control mechanism and support for the lifting mechanism is modified so that the structure is supported from the sides of the pit rather than from the floor of the pit. This allows the floor of the pit to be open for the use of a conventional scraper which moves along the pit for assisting in manure removal. The support is of a low profile construction which allows the bottom of the bag and the bottom of the guide mechanism to be raised as high as possible from the floor of the pit thus keeping the available depth of the pit for manure to a maximum.

Thus the system comprises a cradle 50 which has end plates 51 attached to the sides 52 of the pit 53 so that the cradle spans the width of the pit. The cradle provides a support for the first floor section 54 on which the sow is supported. The first floor section 54 is carried on a rectangular support 55.

At the center section of the cradle 50 is provided a drop support table 56 which is carried at a height below the top of the pit and below the floor. The table 56 carries the bottom end 57 of a gas bag 58. The upper end 59 of the gas bag co-operates with a receptacle 60 at the center of the rectangular support 55 for the first floor section. The gas bag thus provides motive force for raising and lowering the rectangular floor support section 55.

The floor support section 55 is guided so that it is maintained horizontal by a scissors lift mechanism generally indicated at 61 which comprises diagonal link arms 62 and 63 which pivot at one end and slide at the other end so as to maintain the movement of the floor support section in a vertical direction and parallel to the cradle. In addition the vertical movement is controlled and guided by rollers 64 which roll in guide tracks 65. The rollers are carried on the cradle 57 and co-operate with the guide tracks 65 in the form of posts which extend downwardly from the underside of the floor support 55.

The mechanism shown in this embodiment can be modified but the principle involved is that the structure is supported as a cradle from the side walls of the pit and is formed as a low profile construction so that it is as close as possible to the underside of the floor maximizing the area in the pit for manure.

Figure 6:
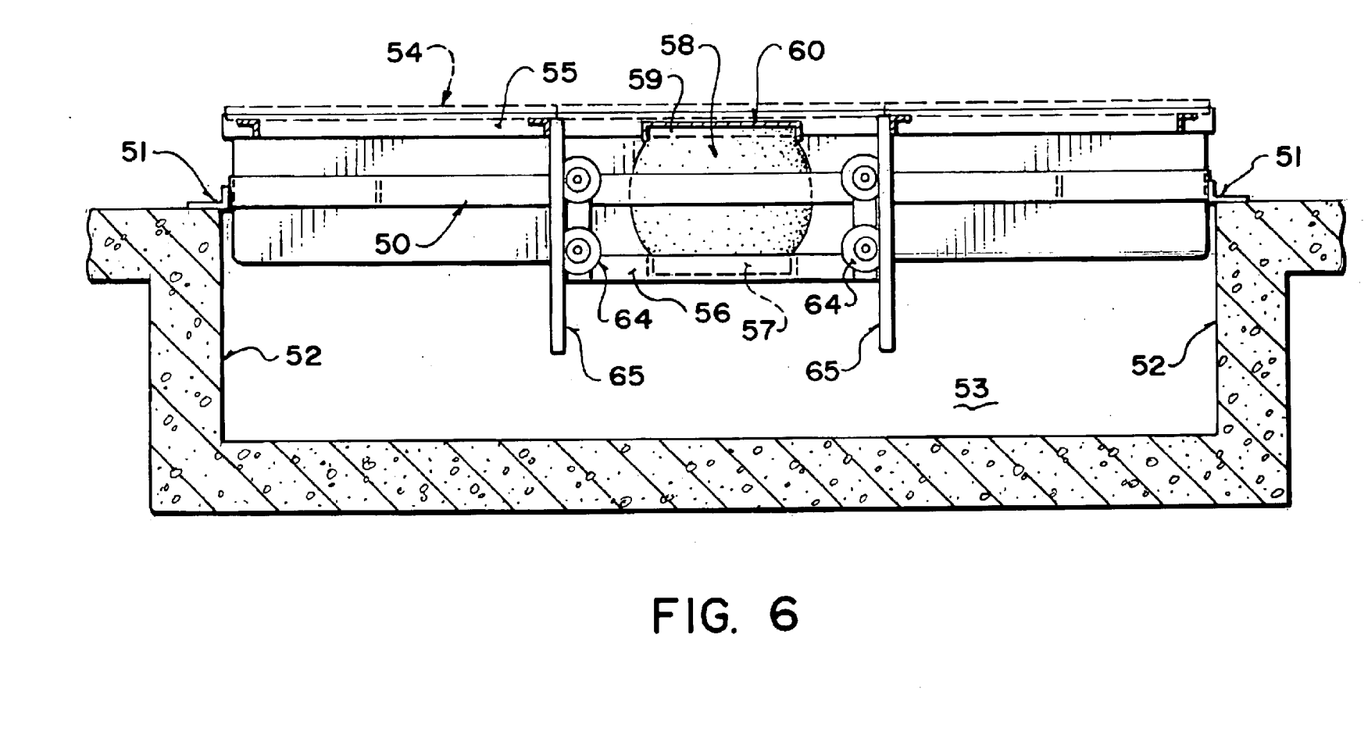
FIG. 6 is a longitudinal cross sectional view of a second embodiment of a sow lift mechanism according to the present invention.
Figure 7:
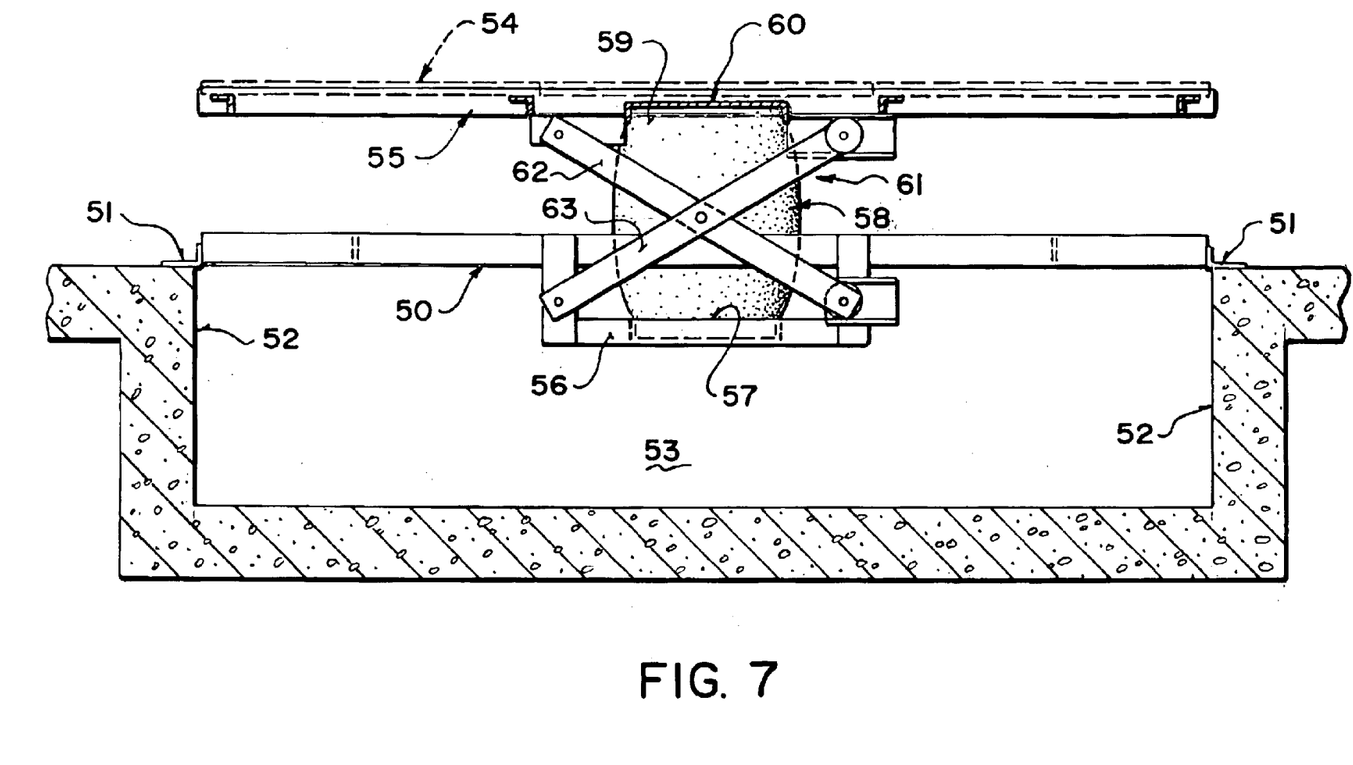
FIG. 7 is a longitudinal cross sectional view the second embodiment of a sow lift mechanism of FIG. 6 in the elevated position.
Figure 8:
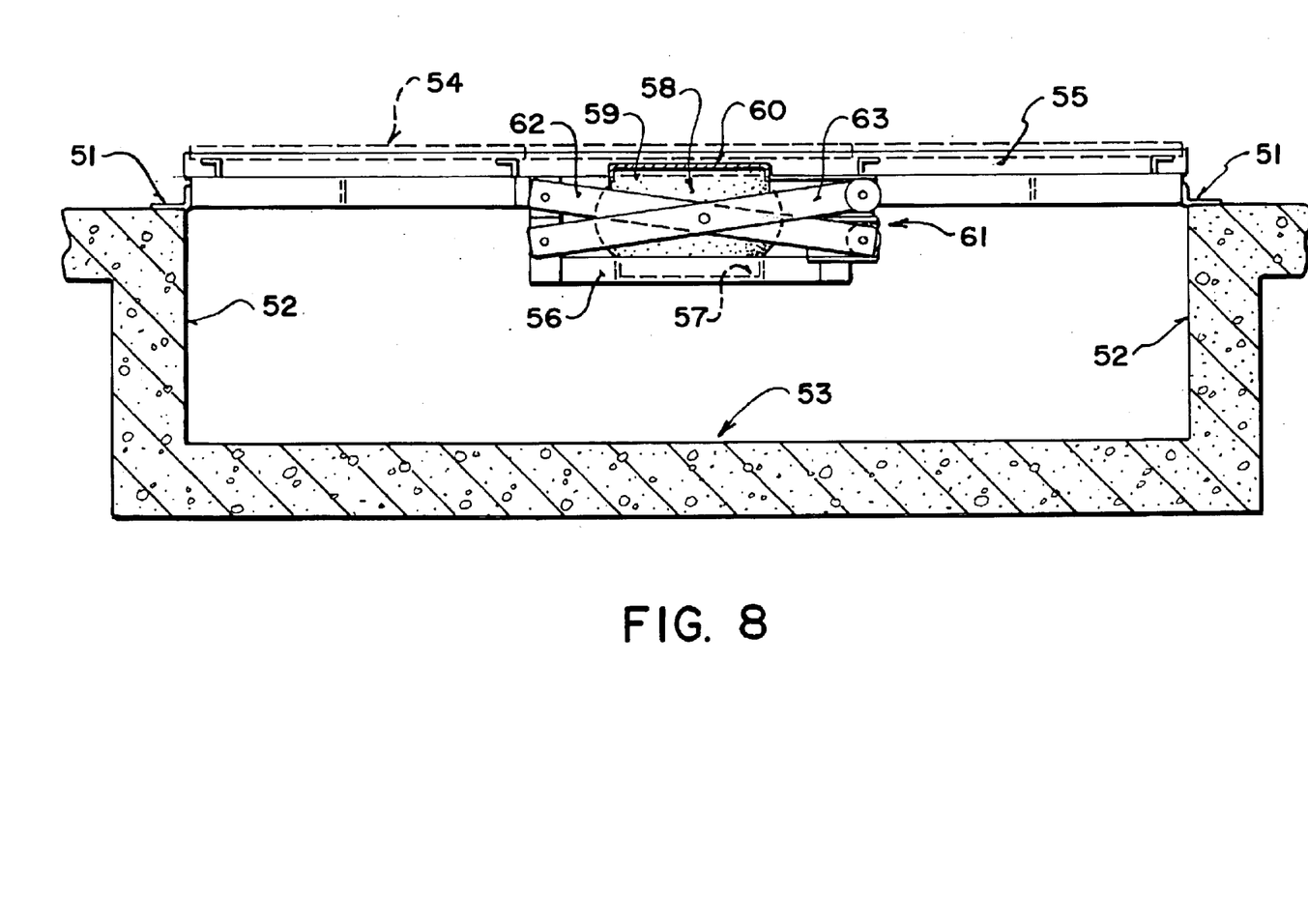
FIG. 8 is a longitudinal cross sectional view the second embodiment of a sow lift mechanism of FIG. 6 in the lowered position.
Figure 9:
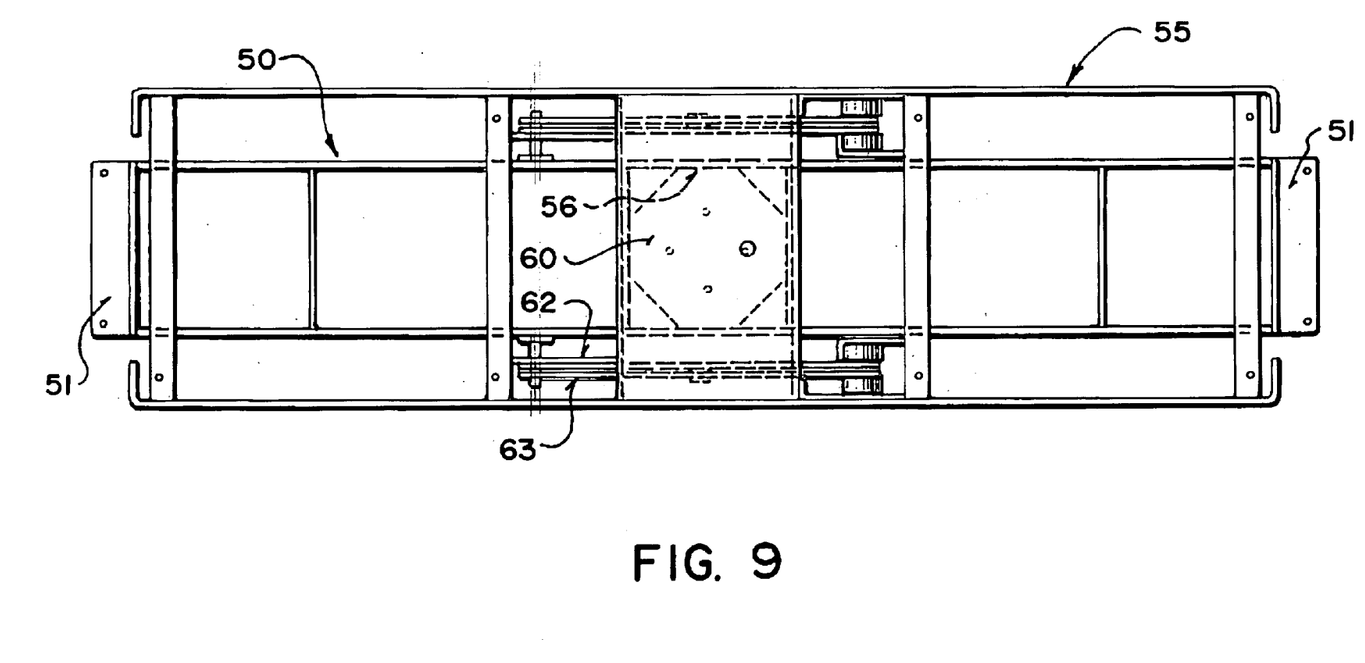
FIG. 9 is a top plan view the second embodiment of a sow lift mechanism of FIG. 6.

In an alternative arrangement (now shown) the side walls of the pit can be formed with transverse support members in the form of one or more beams which extend across the pit at the height of the table 57.

Figure 10:
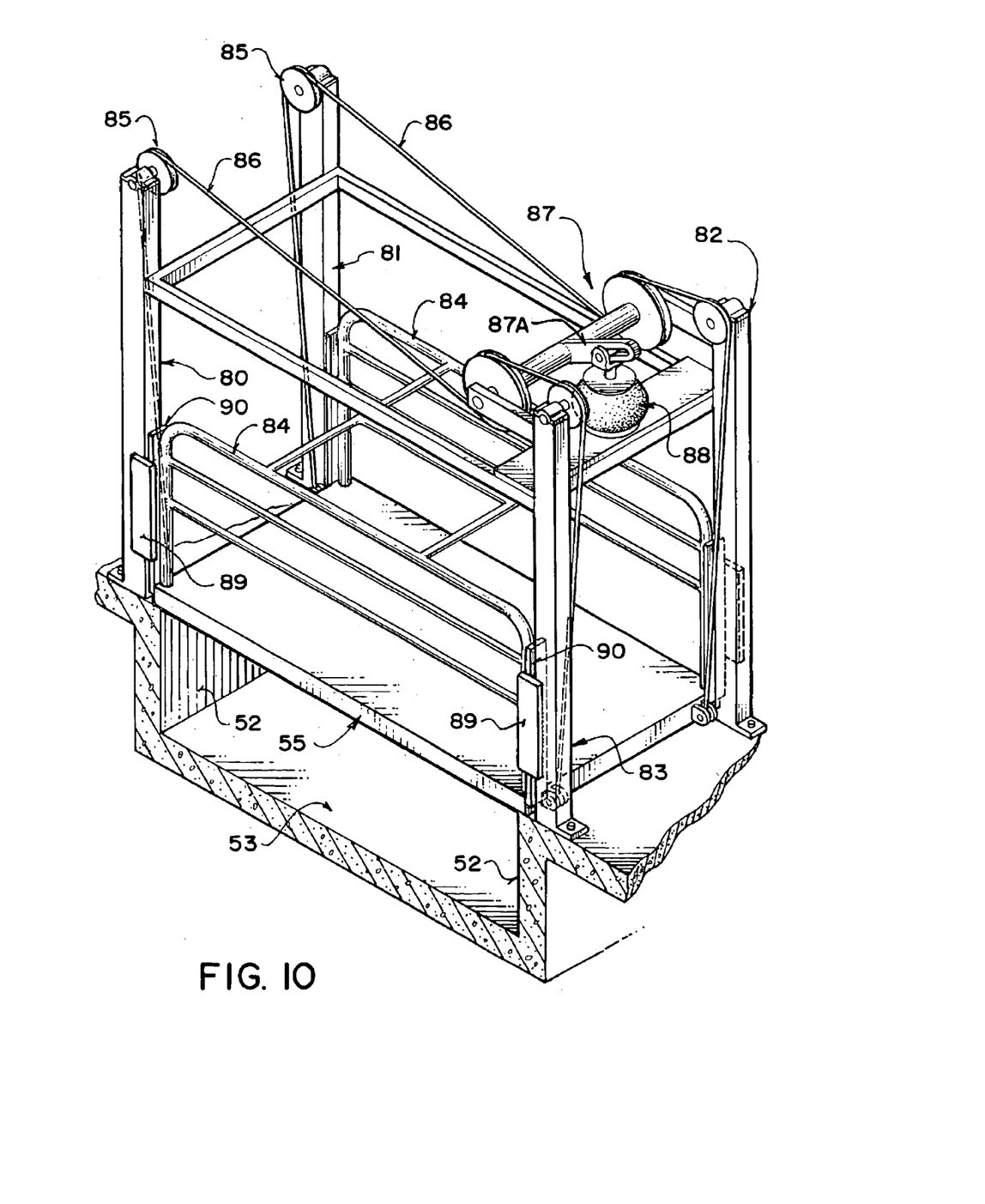
FIG. 10 is an isometric sketch of a third embodiment of a sow lift mechanism according to the present invention.

In FIG. 10 is shown a yet further arrangement which is mounted wholly above the pit. In this arrangement there are provided four posts 80, 81, 82 and 83 which are arranged at the four corners of the first floor section supporting the sow. Side walls 84 of the farrowing crate contain the sow on the floor section. At the top of each post is provided a pulley 85 with a cable 86 which extends downwardly from the pulley to the respective corner of the rectangular frame providing support for the floor section. The cables 86 are pulled by an actuating system generally indicated at 87 which includes a gas bag 88 actuating a lever 89 to the drive a cable pulling system providing equal pull on each of the cables thus tending to lift the rectangular frame 55 in a vertical direction. Side to side and end to end swinging movement of the rectangular frame is prevented by slide guides 89 provided on the post which co-operate with projecting elements 90 provided on the frame 55 or on the confining rolls 84. The guide arrangements can of course vary and can include rollers or wheels which run in a suitable track and the selection of which element carries the track is of course of a minor nature.

The lifting system using the air bag is advantageous as previously described in view of the simple nature of the actuating system which allows the pressure switch to be operated directly by the pressure from the body of the sow.

In all cases the frame 55 carries the depending side walls which prevent access to the pit from the piglets so that they are protected by the side walls which thus form a vertical protection wall as the frame carrying the sow and the confining walls is lifted.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A farrowing pen for sows comprising:

a floor assembly for receiving the sow and piglets which includes a first floor section on which the sow can stand and lie and two second floor sections each on a respective side of the first floor section for receiving piglets of the sow;

the floor assembly including a support structure for supporting the floor sections;

confining walls for locating the sow on the first floor section;

the support structure including a separate support element for carrying the first floor section;

a base member on which the support element is mounted;

a lift mechanism, operated by a power source, carried on the base member and arranged to raise and lower the support element with the first floor section thereon, while the second floor sections remain at a constant height, between a lowered position in which the first floor section is level with the second floor sections and a raised position in which the first floor section is raised to a height above the second floor sections which prevents the sow when lying crushing the piglets on the second floor sections;

and a sensor responsive to movement of the sow tending to stand to actuate the lift mechanism to raise the first floor section and responsive to movement of the sow to a lying position to actuate the lift mechanism to lower the first floor section.

2. The farrowing pen according to claim 1 wherein the sensor comprises a switch which is arranged at the floor for pressure on the switch when the sow is lying.

3. The farrowing pen according to claim 2 wherein the switch includes an actuator which is covered by a cover plate on to which the sow can lie.

4. The farrowing pen according to claim 3 wherein the cover plate is a channel resting along floor bars of the first floor section.

5. The farrowing pen according to claim 1 wherein the lift mechanism includes an air bag and the power source comprises a supply of compressed air and wherein the sensor is arranged for actuating an air supply valve.

6. The farrowing pen according to claim 1 wherein the lift mechanism includes a guide structure for guiding movement of the first floor section in a vertical direction while maintaining the first floor section horizontal.

7. The farrowing pen according to claim 6 wherein the guide structure comprises a plurality of extendible vertical guide legs at horizontally spaced positions relative to the first floor section.

8. The farrowing pen according to claim 1 wherein the floor sections are arranged above a manure pit having a bottom wall for receiving manure falling through the floor and wherein the base member is carried at a position above the bottom wall of the pit as to support the lift mechanism above the manure.

9. The farrowing pen according to claim 8 wherein the base member is carried on a support mounted below the floor and above the bottom of the pit to support the lift mechanism above the manure.

10. The farrowing pen according to claim 9 wherein the base member is carried on a cradle supported from the top of the pit and suspended below the floor to support the lift mechanism above the manure.

11. The farrowing pen according to claim 1 wherein the base member comprises a stand above the floor with the lift mechanism carried on the stand above the floor for lifting the first floor section.

12. The farrowing pen according to claim 11 wherein the lift mechanism carried on the stand above the floor includes cables for pulling on the first floor section.

13. The farrowing pen according to claim 11 wherein the lift mechanism is actuated by an air bag.

14. The farrowing pen according to claim 1 wherein the lift mechanism is arranged such that the time for lowering of the first floor section from the raised position to the lowered position is longer than the time for raising.

15. The farrowing pen according to claim 1 wherein there is provided a manually operable switch for controlling the lift mechanism by which the first floor section can be lowered for release of the sow and by which the first floor section can be raised to maintain the piglets in the second floor section for catching.

16. A farrowing pen for sows comprising:
- a floor assembly for receiving the sow and piglets which includes a first floor section on which the sow can stand and lie and two second floor sections each on a respective side of the first floor section for receiving piglets of the sow;
- the floor assembly including a support structure for supporting the floor sections;
- confining walls for locating the sow on the first floor section;
- the support structure including separate support elements for carrying the first and second floor sections;
- a base member on which the support element is mounted;
- a lift mechanism, operated by a power source, carried on the base member and arranged to raise and lower one of the support elements relative to the other between a position in which the first floor section is level with the second floor sections and a position in which the first floor section is at a height above the second floor section which prevents the sow when lying crushing the piglets on the second floor sections;
- and a sensor responsive to movement of the sow tending to stand to actuate the lift mechanism to operate the lift mechanism;
- wherein the first and second floor sections are all arranged above a manure pit having a bottom floor for receiving manure falling through the floor and wherein the base member is carried at a position above the bottom floor of the pit as to support the lift mechanism above the manure;
- and wherein the base member is carried on a support mounted above the bottom floor of the pit to support the lift mechanism above the manure.

17. The farrowing pen according to claim 16 wherein the base member is carried on a cradle supported from the top of the pit below the floor to support the lift mechanism above the manure.

18. The farrowing pen according to claim 16 wherein the base member is carried above the floor to support the lift mechanism above the floor.

19. The farrowing pen according to claim 16 wherein the lift mechanism comprises an air bag.

20. A farrowing pen for sows comprising:
- a floor assembly for receiving the sow and piglets which includes a first floor section on which the sow can stand and lie and two second floor sections each on a respective side of the first floor section for receiving piglets of the sow;
- the floor assembly including a support structure for supporting the floor sections;
- confining walls for locating the sow on the first floor section;
- the support structure including separate support elements for carrying the first and second floor sections;
- a base member on which the support element is mounted;
- a lift mechanism, operated by a power source, carried on the base member and arranged to raise and lower one of the support elements relative to the other between a position in which the first floor section is level with the second floor sections and a position in which the first floor section is at a height above the second floor section which prevents the sow when lying crushing the piglets on the second floor sections;
- and a sensor responsive to movement of the sow tending to stand to actuate the lift mechanism to operate the lift mechanism;
- wherein the sensor comprises a switch which is arranged at the floor for pressure on the switch when the sow is lying.

21. The farrowing pen according to claim 20 wherein the switch includes an actuator which is covered by a cover plate on to which the sow can lie.

22. The farrowing pen according to claim 21 wherein the cover plate is a channel resting along floor bars of the first floor section.

23. The farrowing pen according to claim 21 wherein the switch comprises a valve for supplying compressed fluid to the lifting mechanism.

24. A farrowing pen for sows comprising:
- a floor assembly for receiving the sow and piglets which includes a first floor section on which the sow can stand and lie and two second floor sections each on a respective side of the first floor section for receiving piglets of the sow;
- the floor assembly including a support structure for supporting the floor sections;

confining walls for locating the sow on the first floor section;

the support structure including separate support elements for carrying the first and second floor sections;

a base member under the floor assembly on which the support element is mounted;

a lift mechanism, operated by a power source, carried on the base member and arranged to raise and lower one of the support elements relative to the other between a position in which the first floor section is level with the second floor sections and a position in which the first floor section is at a height above the second floor section which prevents the sow when lying crushing the piglets on the second floor sections;

and a sensor responsive to movement of the sow tending to stand to actuate the lift mechanism to operate the mechanism;

wherein the lift mechanism includes an air bag and the power source comprises a supply of compressed air and wherein the sensor is arranged for actuating an air supply valve.

25. The farrowing pen according to claim 24 wherein the lift mechanism includes a guide structure for guiding movement of the first floor section in a vertical direction while maintaining the first floor section horizontal.

* * * * *

UNITED STATES PATENT AND TRADEMARK OFFICE
CERTIFICATE OF CORRECTION

PATENT NO. : 6,823,819 B2
DATED : November 30, 2004
INVENTOR(S) : Gerald E. J. Laramee and Jonathan Kleinsasser It is certified that error appears in the above-identified patent and that said Letters Patent is hereby corrected as shown below:

<u>Tilte page,</u>
Item [73], Assignee, should read -- Crystal Spring Hog Equipment Ltd. --

Signed and Sealed this

Twenty-fourth Day of May, 2005

JON W. DUDAS
*Director of the United States Patent and Trademark Office*